April 14, 1953  I. A. GREENWOOD, JR  2,634,721
PRESSURE TRANSDUCER
Filed May 19, 1951
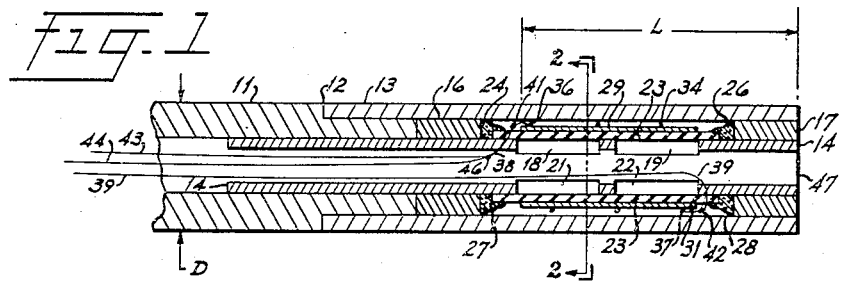
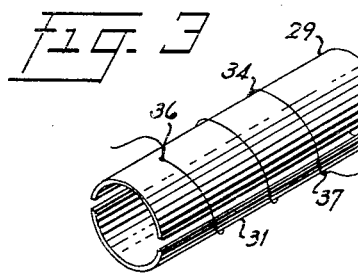
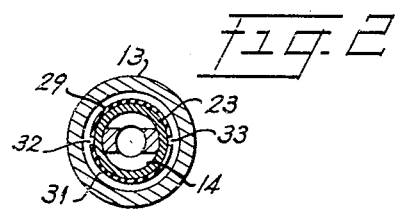
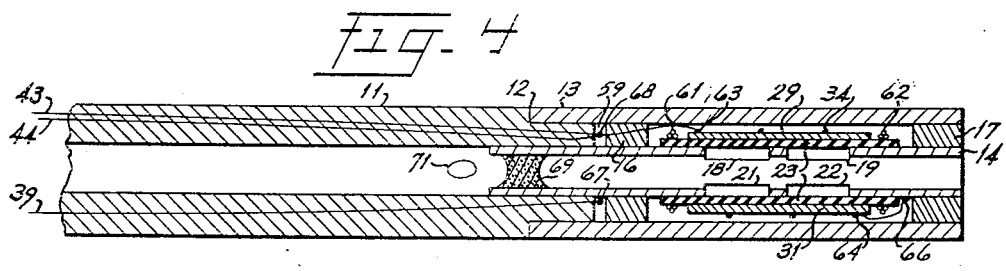
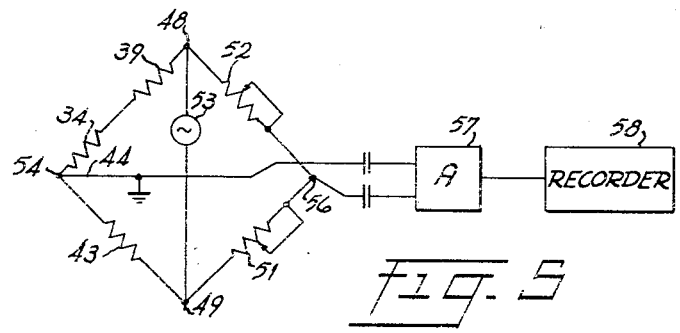
INVENTOR.
IVAN A. GREENWOOD, Jr.
BY
H. S. Mackey
ATTORNEY.

Patented Apr. 14, 1953

2,634,721

UNITED STATES PATENT OFFICE 2,634,721

PRESSURE TRANSDUCER

Ivan A. Greenwood, Jr., Pleasantville, N. Y., assignor to General Precision Laboratory Incorporated, a corporation of New York Application May 19, 1951, Serial No. 227,258

12 Claims. (Cl. 128—2.05)

1

This invention pertains to a pressure transducer for translating mechanical pressure in terms of an electrical quantity. More specifically, this invention pertains to an intracardiac pressure transducer for use in cardiovascular diagnosis.

In the diagnosis of many heart conditions a knowledge of variations in blood pressure during the phases of the heart beat is useful. It is especially useful to be able to measure the instantaneous blood pressure at different points in the heart and in the cardiovascular system, and it has been the practice to accomplish this, although imperfectly, with the cardiac catheter. It has also been the practice to abstract blood samples by means of such a catheter.

The apparatus heretofore used employing a simple catheter tube as a manometer by insertion of the tube through a vein into the heart, measuring the pressure within the heart by manometric means at the distal end, has many faults, the chief fault being inability to read true instantaneous heart pressures due to the behavior of the catheter tube as a dynamic filter, thus preventing rapid pressure changes from reaching the outer end of the catheter.

Attempts made to apply a pressure-detecting device to the inner end of the catheter, such as by use of an electromechanical detector, have been impeded by the sensitivity which such devices exhibit to the motions of the heart, these motions both masking and distorting the electrical signal received from this type of manometer.

The transducer of the instant invention, on the other hand, is substantially insensitive to any motion of the catheter caused by heart beats or otherwise. The transducer is also exceedingly sensitive to pressure, so that changes in pressure of a small fraction of an ounce per square inch are both detected and measured with accuracy, while the transducer is relatively insensitive to temperature variations.

The intracardiac pressure transducer of this invention is a special form of resistance-wire manometer which is mounted in the end of an intracardiac catheter. The transducer comprises two small semicylinders surrounding a flexible tube and held together by a winding of a very few turns of very fine resistance wire, the terminals being brought out through the catheter to external apparatus for measuring resistance changes. The end of the catheter containing the stress-gauge manometer is inserted into the cardiac vascular system until the manometer is at the desired location. The blood pressure at that point then affects the manometer, which follows all of the rapid changes of blood pressure

2 with no noticeable lag and measures the stress with substantially complete fidelity. The semicylinders are separated from the catheter outer wall by a space so that slight changes of pressure in the bore tend to press the semicylinders apart or to permit them to approach each other, thereby straining to a greater or less degree the surrounding wire that binds the semicylinders together. The resistance of the surrounding wire varies in accordance with the strain set up in it, so that by measurement of the resistance by an external instrument the changes of pressure are ascertained.

One object then of this invention is to provide an improved resistance-wire stress gauge adapted for use in confined space.

Another object of this invention is to provide improved means for measuring blood pressure at points within the cardiac vascular system.

More explicitly, an object of this invention is to provide improved manometric means for use with a cardiac catheter.

Still another object is to provide a resistance-wire stress gauge intracardiac manometer that is unaffected by heart motion.

Other objects will become apparent in the detailed description when considered together with the associated drawings, in which:

Figure 1 is a longitudinal cross-section to an enlarged scale, of the end of a cardiac catheter containing the pressure transducer of this invention.

Figure 2 is a cross-section taken on the line 2—2 of Fig. 1.

Figure 3 is a detailed view of the semicylinders of Figs. 1 and 2 carrying the fine wire winding.

Figure 4 is a longitudinal cross-section of another form of the catheter and transducer of the invention.

Figure 5 is a wiring schematic drawing of one circuit used in connection with the transducer of the present invention.

Referring now to Figs. 1 and 2, the manometer of the invention is represented installed in the end of a heart catheter 11, the manometer being so designed that its width does not exceed the catheter diameter D. The drawing is made to an enlarged scale, the diameter D being ⅛ inch or less in the actual catheter and the length L of the active part of the manometer being about ¼ inch. The heart catheter 11 consists of a flexible tube. At the end carrying the manometer the flexible tube is joined at 12 to a stainless steel tube 13 of the same diameter, this tube forming an extension of the catheter and serving as the manometer sheath. A smaller stainless steel bore tube 14 is inserted inside the flexible tube 11, and is secured to the outer stainless steel tube 13 by two tightly fitting spacing rings 16 and 17, these rings making liquid-tight joints with both tubes. Four openings 18, 19, 21, and 22 are formed in the bore tube 14.

Surrounding the bore tube 14 and completely covering the four openings therein is a resilient latex tube 23 which is cemented or otherwise fastened at each end to the bore tube 14, the cement being represented at 24, 26, 27, and 28. Surrounding the latex layer 23 there are placed two semicylindrical members 29 and 31, in such manner that the longitudinal edges thereof are somewhat separated as illustrated at 32 and 33, Fig. 2. The semicylinders 29 and 31 are made of stainless steel and have very smooth outer surfaces. A fine high-resistive wire 34 is wrapped several times around both semicylinders with a slight amount of tension, binding them together and holding them snugly to the latex tube 23. This slight pre-stressing of the wire in winding permits the transducer not only to measure positive pressures but also to measure small negative pressures.

This wire is made of metal such as constantan, isoelastic, or other conventional strain gauge material that has a low temperature coefficient of resistance, low mechanical hysteresis and good gauge factor. It has a diameter of approximately .001 inch and is enamel insulated. The wire may be anchored at points 36 and 37 near its ends to the semicylinders by nonconductive cement so as to provide mechanical anchorage at these two points without permitting electrical contact between any parts of the semicylinder and the wire. Conductors 38 and 39 are attached to the fine wire at welds 41 and 42. The conductor 38 is separated into two conductors 43 and 44 at another weld 46 to help compensate for effects of temperature changes as will be more fully explained in connection with a circuit for utilization of the manometer, and these two conductors 43 and 44 are brought out through the bore of the catheter 11. The conductor 39 is also brought out through the catheter tube bore.

Obviously the employment of the bore as a duct for the lead conductors may interfere with the free passage of blood therethrough. Therefore it is desirable when the bore is to be employed for the withdrawal of blood samples to dispose the conductors otherwise. For instance, the conductors can be incorporated in the wall of the tubing when it is manufactured.

The employment of the described construction may have a deleterious effect upon the measurement of instantaneous blood pressures which exist at the open interior end of the catheter tube, for the reason that the body of liquid within the tube, having mass, is affected by movements of the tube caused in any way such as by heart movements. Since the body of liquid in the tube is in contact with the liquid at the end of the tube, its accelerations will affect the apparent instantaneous pressures measured by the transducer. In order to eliminate this cause of error the bore is blocked behind the transducer, so that the small amount of blood within the bore of the transducer is not affected by any accelerations in the liquid within the remainder of the catheter. An opening is made in the catheter wall behind the block if blood samples are to be withdrawn.

In brief, the operation of the strain-gauge transducer is as follows: The catheter and transducer are coated inside and out with silicone liquid in the conventional manner, and then the catheter is filled with saline solution and inserted into the cardiovascular system until its open end 47 is at the desired location therein. Blood makes liquid contact with the saline solution in the catheter bore and blood pressure pulsations are therefore transmitted through the blood and solution to the openings 18, 19, 21, and 22 in the stainless steel bore tube 14, where they are transmitted to the inner surface of the latex tube 23. Through the walls of this tube the pulsations are transmitted to the semicylinders 29 and 31, tending to spread them apart and thus applying stress to the several turns of wire 34 that bind the two semicylinders together and prevent them from separating. The resulting stress in the wire both elongates it and reduces its cross-section, both results causing increase of resistance. This resistance increase is measured and used as a quantitative representation of the pressure change that caused it.

The nature of the relationship between blood pressure change and resistance change is better shown by reference to Fig. 3, depicting the two semicylinders 29 and 31, the wire 34 wound two and a half turns around the semicylinders, and the wire anchors 36 and 37 on the semicylinders 29 and 31, respectively. Pressure within the bore tends to separate the two cylinders, causing stress to be exerted upon the wire 34 which in the figure, has five strands or two and a half turns connecting the cylinders. That is, $$2nT = 2rlp \quad (1)$$

in which $n$ = number of turns of wire (here 2½),
$T$ = tension in each strand,
$r$ = radius of the semicylinders,
$l$ = length of the semicylinders, and
$p$ = unit pressure within the cylinder exerted by the blood.

Solving for $T$, $$T = \frac{rlp}{n} \quad (2)$$

It is well known that in a wire under tension the fractional change of electrical resistance is proportional to the fractional change in length caused by the tension, multiplied by a factor which, in the case of constantan is approximately 2. That is, $$\frac{\Delta R}{R} = 2\frac{\Delta L}{L} \quad (3)$$

in which $R$ = wire resistance,
$L$ = length of wire,
$\Delta R$ = increment of resistance,
$\Delta L$ = increment of length.

Since $$Y = \frac{s}{\frac{\Delta L}{L}} \quad (4)$$

in which $Y$ = Young's modulus,
$s$ = stress,
$\frac{\Delta L}{L}$ = strain as defined then $$\frac{\Delta L}{L} = \frac{s}{Y} \quad (5)$$

But also $$s = \frac{T}{A} \quad (6)$$

in which $A$ = cross-sectional area of the wire.

Therefore, combining (5) and (6)

$$\frac{\Delta L}{L} = \frac{T}{AY} \quad (7)$$

and since $$A = \left(\frac{d}{2}\right)^2 \pi \quad (8)$$

in which $d$ = wire diameter, $$\frac{\Delta R}{R} = \frac{2\Delta L}{L} = \frac{2rlp}{n\left(\frac{d}{2}\right)^2 \pi Y} \quad (9)$$

These equations indicate that the greatest sensitivity of the device is secured with fewest turns $n$, and for that reason the minimum number of turns which is mechanically and electrically feasible for proper operation is employed. In general it may be stated that the winding 34 should include at least one turn in order that the elements may be properly held together and at the same time this winding should not exceed fifteen turns for proper sensitivity of response.

A slightly different form of cardiac catheter containing the pressure transducer is illustrated in Fig. 4, in which the flexible heart catheter tube 11 is joined to an external stainless steel tube 13 at the junction 12 as before. The bore tube 14 is joined to the external tube 11 by means of the two spacing rings 16 and 17, an annular space 59 being left, however, between the spacing ring 16 and the catheter tube 11 to facilitate connection of terminal wires to the transducer. The bore tube 14 contains four openings 18, 19, 21, and 22, which are externally surrounded by a resilient tube 23. The resilient tube 23 is secured at each end in a liquid-tight manner to the bore tube 14 which it surrounds by wire wrappings 61 and 62. Two semicylinders 29 and 31 partly surround the resilient tube 23 and are carried by it. These semicylinders 29 and 31 in turn are surrounded by a fine wire wrapping 34 that constitutes the active element of the stress gauge. This wire wrapping 34 binds the semicylinders to the resilient tube and is composed of enamel-insulated constant-temperature-coefficient wire of, for instance, size 50 A. W. G. Its initial tension is such that its stress-strain characteristic is straight-line at the origin and for small negative stresses. so that completed instrument measures with fidelity pressures that go somewhat below atmospheric pressure. The wire 34 is secured by insulating cement to the semicylinders at its ends, as at 63 and 64.

The ends of the wire 34 are brought out from the anchored end points 63 and 64, the wire being brought from the anchored point 64 to the steel bore tube, where it is electrically secured at the point 66. At a point 67 on the same tube, within the annular space 59, the conductor 39 is connected. It is desirable in this construction that the conductor 39 be made the ground point of the system. The anchored point 63 is brought out through a pressure-sealed groove or hole in the sealing ring 16 to a weld point 68, where it is welded to two conductors 43 and 44.

The three conductors 39, 43, and 44 are incorporated in the wall of the catheter tube 11 by moulding in manufacture or otherwise.

In order to prevent any dynamic effect of the mass of the liquid in the catheter tube upon the accuracy of transducer measurement, a drop of cement 69 is placed to serve as a block in the bore tube. In order to permit the securing of blood samples a hole 71 is provided in the catheter tube above the block 69.

A number of circuits are available for measuring changes in resistance of the transducer of the invention. One such circuit is illustrated in Fig. 5. It is preferred over some others because it eliminates the effects of temperature changes upon the conductor resistance and also eliminates any effects of thermoelectric voltages. The resistance X represents the total resistance of the stress gauge wire 34 illustrated in Figs. 1, 3, and 4 wrapped around the two semicylinders 29 and 31. The conductor 43, Figs. 1, 4, and 5, is made of the same alloy having a relatively constant temperature coefficient of resistance as that from which the stress gauge wire 34 is constructed, but the wire size of the conductor 43 is larger than that of the stress gauge wire. The conductor 39 is also made of the same alloy but of still larger size than the conductor 43, the diameters and lengths being so proportioned that the resistance of the stress gauge wire 34 added to that of conductor 39 approximately equals the resistance of the conductor 43.

The stress gauge wire 34 with its conductor 39 and its conductor 43 are connected in series between terminals 48 and 49, Fig. 5, forming two arms of a bridge. The other two arms are composed of adjustable resistors 51 and 52. The bridge so formed is energized by an alternating current source 53 having a frequency of the order of 2000 cycles per second connected between terminals 48 and 49. The use of alternating current as a power source has the advantage that effects of thermoelectric voltages are eliminated and amplification of the errior signal is facilitated. The conductor 44, Figs. 1 and 4, connected to the weld 46 or 68 may be of any metal and of any resistance as it carries error signal only. This conductor is connected to the bridge terminal 54, and may also be grounded. A suitable detector is connected between terminals 54 and 56. Such a detector 57 may consist, for example, of an alternating current amplifier, phase detector and direct-coupled amplifier, and is followed by a recorder 58 of any type such as a conventional electromagnetic pen recorder.

In the operation of the circuit, the adjustable resistor 51 is first set to a value approximately equal to that of the conductor 43, and second, the adjustable resistor 52 is adjusted to that value for which the error signal recorded at 58 falls to zero. The resistance of the resistor 52 then equals the combined resistance of the stress gauge 34 and its conductor 39, and under change of pressure the difference in resistance of the resistor 52 represents the difference in resistance of the strain gauge 34. This operation thus measures the absolute value of a stress gauge change in an accurate manner which is unaffected by changes in conductor and stress gauge temperatures and which is also completely insensitive to motion of the transducer or of any other part of the apparatus.

In recording the relatively rapid changes of pressure caused by the beating of the heart, it is necessary to record changes abrupt enough to be equivalent to a sinusoidal frequency of roughly 50 cycles per second and therefore requiring equipment capable of recording such frequencies with fidelity. Obviously, such rapid changes of pressure cannot be followed by manual setting of the adjustable resistor 52 but the bridge may be employed as an unbalanced bridge permitting changes in pressure to change the magnitude of the error signal, which is then recorded by the recorder 58 as a variable voltage above or below the value representing the setting of the adjustable resistor 52.

What is claimed is:

1. An electromechanical pressure transducer comprising, a soft pliable sleeve member internally subjected to fluid pressure to be measured, a helical winding composed of a material whose electrical resistance varies with the stress imposed thereon surrounding said sleeve member, and at least one elongated rigid member extending in a direction parallel to the axis of said sleeve member and interposed between the exterior surface thereof and said winding whereby pressure variations imposed over a substantial area of said sleeve member are transmitted to said winding by the bodily movement of said elongated member.

2. An electromechanical pressure transducer as defined in claim 1 in which said helical winding is composed of not less than one and not more than fifteen turns.

3. An electromechanical pressure transducer comprising, a soft pliable sleeve member, a rigid sleeve member positioned internally of said pliable sleeve member and acting as a support therefor, said rigid sleeve member being provided with at least one aperture for communicating internal pressure variations to the interior surface of said pliable sleeve member, a helical winding composed of a material whose electrical resistance varies with the stress imposed thereon surrounding said pliable sleeve member, and at least one elongated rigid member interposed between the exterior of said pliable sleeve member and said winding at the location of said aperture in said rigid sleeve member, whereby pressure variations communicated to said pliable sleeve member through said aperture and imposed over a substantial area thereof are transmitted to said winding by the bodily movement of said elongated member.

4. An electromechanical pressure transducer as defined in claim 3 in which said helical winding is composed of not less than one and not more than fifteen turns.

5. An electromechanical pressure transducer comprising, a resilient sleeve member internally subjected to fluid pressure to be measured, a pair of rigid semicylindrical members engaging the exterior surface of said resilient member and extending along the longitudinal length thereof, said semicylindrical members having their adjacent edges spaced from each other, and a helical winding surrounding said semicylindrical members, said winding being composed of a material whose electrical resistance varies with the stress imposed thereon.

6. An electromechanical pressure transducer as defined in claim 5 in which said helical winding is composed of not less than one and not more than fifteen turns.

7. An intracardiac pressure transducer comprising, a cardiac catheter, a sleeve affixed to one end thereof forming a continuation of the body of said catheter, a rigid sleeve positioned interiorly of said first mentioned sleeve having its external surface spaced therefrom, means for sealing said rigid sleeve to said first mentioned sleeve at spaced longitudinal positions to form an annular chamber therebetween, a resilient sleeve surrounding said rigid sleeve and positioned in said annular chamber, said rigid sleeve being provided with apertures in the walls thereof so that fluid pressure existing internally of said rigid sleeve is communicated to the interior surface of said resilient sleeve, at least two elongated rigid members engaging the exterior surface of said resilient sleeve and radially spaced from the interior surface of said first mentioned sleeve, and a helical winding overlying said elongated members, said winding being composed of a material whose electrical resistance varies with the stress imposed thereon.

8. An intracardiac pressure transducer as defined in claim 7 in which said helical winding is composed of not less than one and not more than fifteen turns.

9. An intracardiac pressure transducer comprising, a cardiac catheter, a sleeve affixed to one end thereof forming a continuation of the body portion of said catheter, a rigid sleeve positioned interiorly of said first mentioned sleeve having its external surface spaced therefrom, means providing a hermetic seal between said rigid sleeve and said first-mentioned sleeve at longitudinally spaced positions forming an annular chamber therebetween, a resilient sleeve positioned in said annular chamber and surrounding said rigid sleeve, said rigid sleeve being provided with apertures in the walls thereof whereby fluid pressure existing internally of said rigid sleeve is communicated to the interior surface of said resilient sleeve, at least two elongated members of arcuate cross section in engagement with the exterior of said resilient sleeve and radially spaced from the interior surface of said first-mentioned sleeve, and a helical winding overlying said arcuate elongated members, said winding being composed of a material whose electrical resistance varies with the stress imposed thereon.

10. An intracardiac pressure transducer as defined in claim 9 in which said helical winding is composed of not less than one and not more than fifteen turns.

11. An intracardiac pressure transducer comprising, a cardiac catheter, a sleeve affixed to one end constituting an extension thereof, a rigid sleeve positioned interiorly of said first sleeve member having its exterior surface spaced therefrom, means providing a seal between said rigid sleeve and said first-mentioned sleeve at longitudinally spaced positions forming an annular enclosed chamber therebetween, a resilient sleeve surrounding said rigid sleeve and positioned in said chamber, said rigid sleeve being provided with apertures in the portion of the rigid sleeve surrounded by said resilient sleeve, a pair of semicylindrical members engaging the exterior surface of said resilient sleeve and extending along the longitudinal length thereof, said semicylindrical members having their adjacent edges spaced from each other, and a helical winding around said semicylindrical members, said winding being composed of a material whose electrical resistance varies with the stress imposed thereon.

12. An intracardiac pressure transducer as defined in claim 11 in which said helical winding is composed of not less than one turn and not more than fifteen turns.

IVAN A. GREENWOOD, JR.

References Cited in the file of this patent

UNITED STATES PATENTS

| Number | Name | Date |
| --- | --- | --- |
| 2,420,148 | Ostergren | May 6, 1947 |
| 2,566,326 | Guillemin, Jr. | Sept. 4, 1951 |